United States Patent [19]

Sasaki et al.

[11] Patent Number: 5,309,183
[45] Date of Patent: May 3, 1994

[54] IMAGE PICKUP APPARATUS HAVING DIFFERENCE ENCODING AND NON-LINEAR PROCESSING OF IMAGE SIGNALS

[75] Inventors: Takashi Sasaki, Yokohama; Izuru Horiuchi, Machida, both of Japan

[73] Assignee: Canon Kabushiki Kaisha, Tokyo, Japan

[21] Appl. No.: 59,727

[22] Filed: May 11, 1993

Related U.S. Application Data

[63] Continuation of Ser. No. 920,167, Jul. 27, 1992, abandoned, which is a continuation of Ser. No. 587,049, Sep. 24, 1990, abandoned.

[30] Foreign Application Priority Data

Sep. 28, 1989 [JP] Japan .................. 1-250689
Sep. 17, 1990 [JP] Japan .................. 2-243911
Sep. 17, 1990 [JP] Japan .................. 2-243912

[51] Int. Cl.⁵ .................. H04N 9/04; H04N 9/07
[52] U.S. Cl. .................. 348/233; 348/273; 348/409
[58] Field of Search .................. 358/41, 43, 44, 906, 358/909, 209, 133, 135, 136, 310, 335, 336, 13, 12, 14, 15, 18, 21 R, 31, 34, 35, 37; 341/126, 128, 129, 138, 139, 140; H04N 9/04, 9/07

[56] References Cited

U.S. PATENT DOCUMENTS

| | | | |
|---|---|---|---|
| 3,017,456 | 1/1962 | Schrieber | 358/133 |
| 3,646,548 | 2/1972 | Van Doren | 341/138 |
| 3,688,221 | 8/1972 | Fruhalf | 341/138 |
| 3,798,637 | 3/1974 | Fruhauf | 341/138 |
| 3,882,484 | 5/1975 | Brokaw et al. | 341/138 |
| 4,176,573 | 11/1979 | Dillon et al. | 388/41 |
| 4,468,708 | 8/1984 | Coleman, Jr. | 358/133 |
| 4,500,913 | 2/1985 | Hashimoto et al. | 358/44 |
| 4,525,737 | 6/1985 | Hashimoto et al. | 358/44 |
| 4,580,160 | 4/1986 | Ochi et al. | 358/48 |
| 4,682,186 | 7/1987 | Sasaki et al. | |
| 4,731,662 | 3/1988 | Udagawa et al. | |
| 4,758,883 | 7/1988 | Kawahara et al. | 358/41 |
| 4,758,885 | 7/1988 | Sasaki et al. | |
| 4,766,485 | 8/1988 | Takayama | 358/909 |
| 4,845,553 | 7/1989 | Konomura et al. | 358/44 |
| 4,941,037 | 7/1990 | Sasaki et al. | |
| 5,016,107 | 5/1991 | Sasson et al. | 358/209 |
| 5,053,861 | 10/1991 | Tsai et al. | 358/41 |
| 5,172,227 | 12/1992 | Tsai et al. | 358/44 |
| 5,194,944 | 3/1993 | Uchiyama et al. | 358/41 |

FOREIGN PATENT DOCUMENTS 0323194 7/1989 European Pat. Off.

OTHER PUBLICATIONS

"Charge-coupled device (CCD) camera/memory optimization for expendable autonomous vehicles", Robert and Mathews, Optical Engineering, (Apr. 1982).
"Experimental color Facsimile Equipment Using Differential Pulse Code Modulation", L. Gavrilov, et al., Telecommunications & Radio Engineering (Feb. 1981).

*Primary Examiner*—Mark R. Powell
*Assistant Examiner*—Michael H. Lee
*Attorney, Agent, or Firm*—Fitzpatrick, Cella, Harper & Scinto

[57] ABSTRACT

An image pickup apparatus having difference encoding and non-linear processing of image signals includes a difference encoding circuit for quantizing a difference between signals from adjacent pixels, every other pixel, or pixels having a same color filter, in a solid-state image pickup element. A non-linear processing circuit non-linearly processes the output from the difference encoding circuit. An apparatus main body has an output terminal for supplying an output from the non-linear processing circuit, and a storage body capable of recording the output from the apparatus output terminal is coupled to the main body.

13 Claims, 15 Drawing Sheets

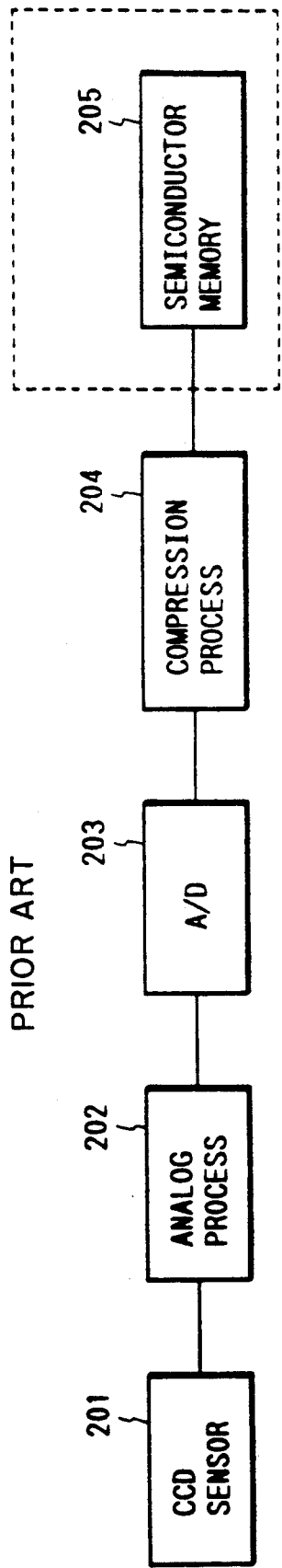

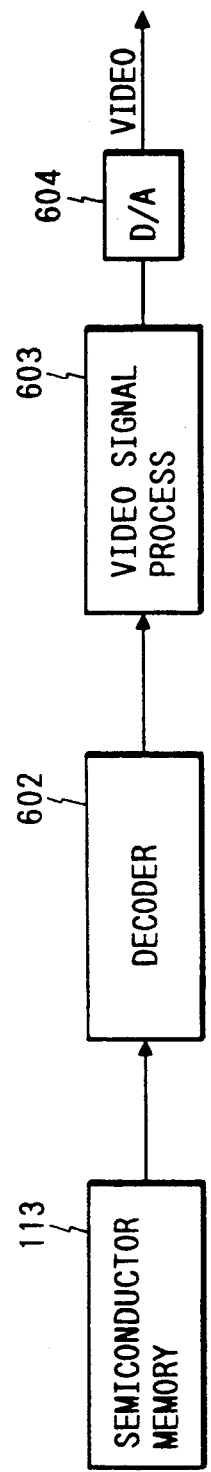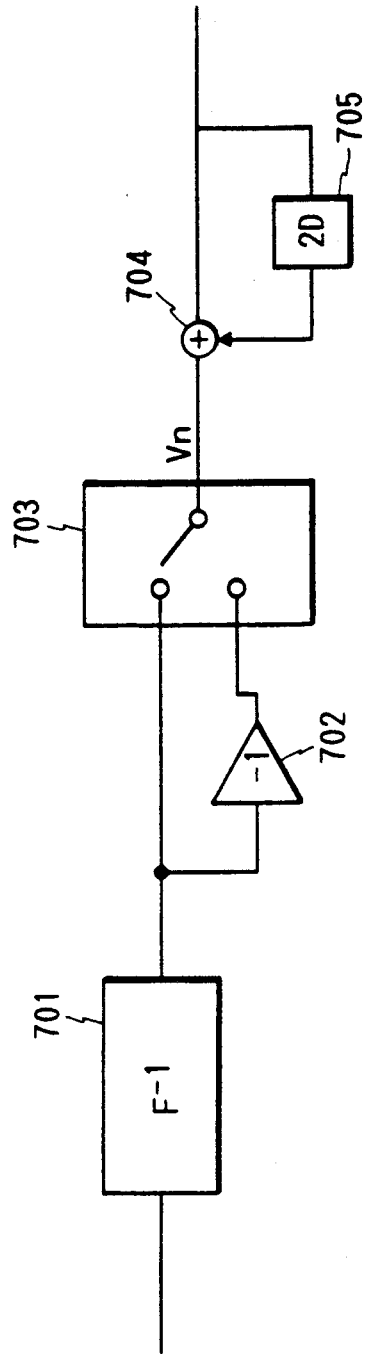

FIG. 9A

| R | G | B | R | G |
|---|---|---|---|---|
| R | G | B | R | G |
|   |   |   |   |   |

FIG. 9B

| Cy | G | Ye | Cy | G |
|----|---|----|----|---|
| Cy | G | Ye | Cy | G |
|    |   |    |    |   |

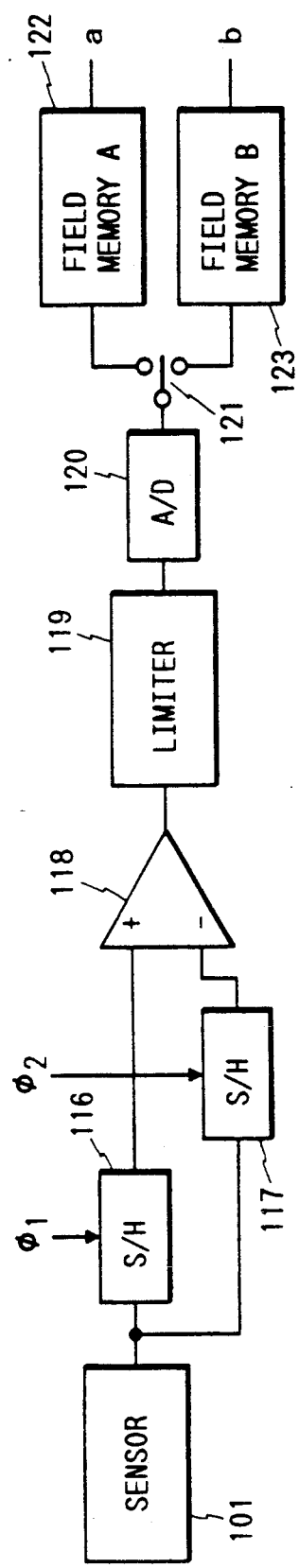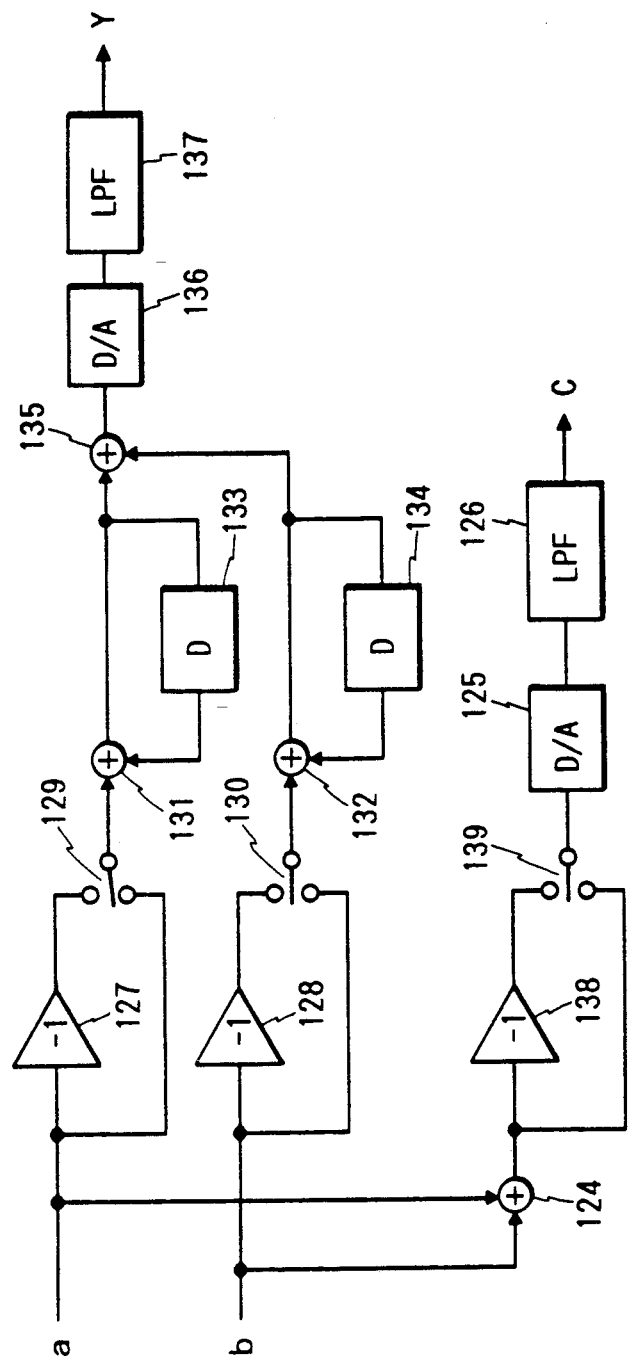
FIG. 10A
FIG. 10B

| Ye-Cy | Ye-Cy | |
|---|---|---|
| Ye-Cy | Ye-Cy | |
| | | |

| Mg-G | Mg-G | |
|---|---|---|
| G-Mg | G-Mg | |
| | | |

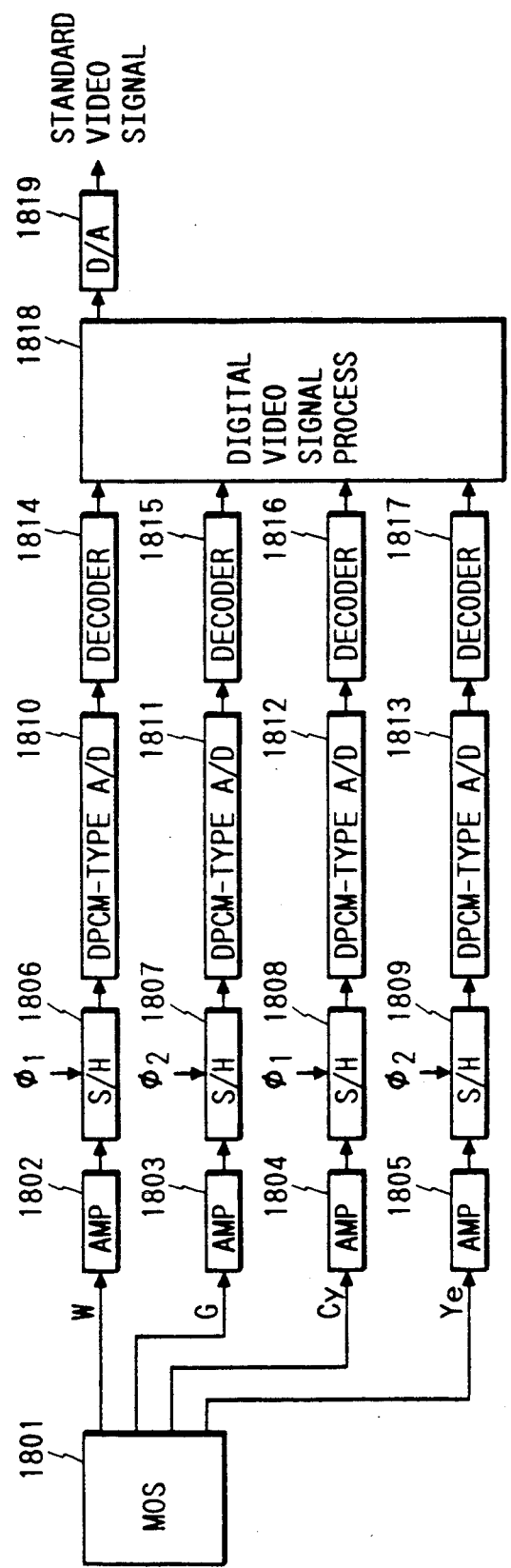

IMAGE PICKUP APPARATUS HAVING DIFFERENCE ENCODING AND NON-LINEAR PROCESSING OF IMAGE SIGNALS

This application is a continuation of application Ser. No. 07/920,167 filed Jul. 27, 1992, now abandoned, which is a continuation of application Ser. No. 07/587,049 filed on Sep. 24, 1990, now abandoned.

BACKGROUND OF THE INVENTION

1. Field of the Invention

The present invention relates to an image pickup apparatus such as an electronic still camera.

2. Related Background Art

In recent years, an electronic still camera has been developed which A/D (analog-to-digital) converts a signal output from a solid-state image pickup element such as a CCD (charge coupled device), and stores the digital data in a detachable semiconductor memory or a rotary floppy disk, thus allowing omission of a photographic film: example, a signal from a CCD sensor 201 which has color filters shown in FIGS. 2A to 2C in units of pixels is subjected to, e.g., a CDS (Correlated-Double-Sampling) process, a blanking pulse insert process, a preknee process, and the like in an analog process unit 202, and the processed signal is then converted into, e.g., 9-bit digital data by an A/D converter 203.

If this digital data is directly stored in a semiconductor memory 205, a capacity per frame is too large, and the number of images capable of being stored in a single semiconductor memory is reduced, resulting in an inconvenient electronic still camera.

A compression process unit 204 is normally arranged to compress digital data, and the compressed data is then stored in the semiconductor memory 205. Various compression methods are known. Of these methods, DPCM (differential pulse code modulation) and DCT (discrete cosine transformation) are often adopted.

Such a prior art suffers from two problems.

The first problem lies in arrangement of the A/D converter. In order t obtain satisfactory image quality free from quantization noise, the A/D converter 203 preferably has a larger number of quantization bits. In particular, when color filters are complementary color filters, since color signals are not base-band signals but modulated signals, at least 9 bits are necessary. This leads to a complicated arrangement of the A/D converter and an increase in cost of the apparatus.

The second problem lies in the compression process unit 204. Of course, the compression process unit is preferably omitted since a circuit arrangement can be simplified. However, if data is not compressed at all, the number of images which can be stored in the semiconductor memory is considerably decreased, as described above, resulting in inconvenience. Therefore, since the compression process unit must be separately arranged, this also leads to a complicated arrangement and an increase in cost.

In an image pickup apparatus such as a color video camera, color separation filters attached to a sensor often comprise complementary color filters rather than pure color filters.

The complementary color filters are advantageous in terms of a light utilization ratio, a band, and the like as compared with pure color filters.

Many sensors having complementary color filters have been developed mainly for movie cameras. FIG. 2C shows such a filter matrix. In order to obtain a still image for one frame using this sensor, read access is required twice per pixel, and exposure must be executed twice.

SUMMARY OF THE INVENTION

The present invention has been made to solve the conventional problems, and has as its object to provide an image pickup apparatus which can guarantee sufficient image quality using an A/D converter having a smaller number of bits without requiring an independent compression process unit.

It is another object of the present invention t provide a digital signal process apparatus which can obtain a still image using a sensor for a movie camera, and can decrease the number of bits upon digital processes including A/D conversion.

It is still another object of the present invention to provide a signal process apparatus employing a DPCM scheme, which can decrease cost, and is easy to design while assuring high precision.

According to an embodiment of the present invention, in order to achieve the above object, a differential encoding means for quantizing a difference between signals having a high correlation, i.e., a difference between signals of adjacent pixels in a solid-state image pickup element is employed.

According to the embodiment of the present invention, in order to achieve the above objects, the image pickup apparatus comprises the following arrangement (1) or (2):

(1) An image pickup apparatus comprises differential encoding means for quantizing a difference between signals of adjacent pixels in a solid-state image pickup element, an apparatus main body having an apparatus output terminal for supplying an output from the differential encoding means, and a storage body capable of recording the output from the apparatus output terminal of the apparatus main body.

(2) An image pickup apparatus comprises a solid-state image pickup element having a plurality of color filters, differential encoding means for quantizing a difference between signals from pixels of the same kind of horizontally adjacent pixels in the solid-state image pickup element, an apparatus main body having an apparatus output terminal for supplying an output from the differential encoding means, and a storage body capable of recording the output from the apparatus output terminal of the apparatus main body.

With the above arrangement (1) or (2), signals from the solid-state image pickup element are compressed and encoded, and are then stored in the storage body.

With this arrangement, since precision of 9 to 11 bits or more can be obtained using an A/D converter of, e.g., 6 to 8 bits, the above-mentioned first problem can be solved. Since the output from the differential encoding means corresponds to a compressed result of a output itself, it can be directly recorded in a semiconductor memory without requiring an independent compression process unit, thus solving the second problem.

As is well known, in order to increase compression efficiency upon quantization of a difference, a difference between signals having a high correlation coefficient is preferably quantized to increase DPCM efficiency (e.g., "Digital Signal Process of Image" by Fukinuke, Nikkan Kogyo Shinbun).

Correlation coefficients $R_{ij}$ of pixels in the matrix shown in FIG. 2A were examined in practice. It was found that correlations of signals from pixels of the same kind of color filters were high, as shown in Table 1 below. Note that $R_{ij}$ is the correlation coefficient between $P_{XY}$ and $P_{X+i,Y+j}$ (where $P_{XY}$ is the pixel having horizontal and vertical addresses X and Y).

TABLE 1

| j \ i | 0 | 1 | 2 | 3 |
|---|---|---|---|---|
| 0 | 1.0 | 0.60 | 0.96 | 0.54 |
| 1 | 0.77 | 0.91 | 0.73 | 0.75 |
| 2 | 0.62 | 0.80 | 0.79 | 0.76 |
| 3 | 0.72 | 0.75 | 0.70 | 0.71 |

Therefore, a differential encoding means according to the second embodiment of the present invention is arranged so that not a difference between horizontally or vertically adjacent pixel signals but a difference between signals from adjacent pixels corresponding to the same kind of color filters is calculated, thus providing a more efficient arrangement. For example, in a matrix shown in FIG. 2A, since a correlation between pixels ($R_{00}$ and $R_{02}$) which are separated by two pixels in the horizontal direction is extremely high, the differential encoding means calculates a difference between signals from these pixels, resulting in high encoding efficiency.

In order to achieve the above objects, according to still another embodiment of the present invention, a digital signal process apparatus comprises the following arrangement (3) or (4):

(3) A digital signal process apparatus comprises difference signal forming means for receiving signals from a solid-state image pickup element having complementary filters, and forming a signal corresponding to a difference between signals from adjacent pixels, A/D conversion means for A/D-converting an output from the difference signal forming means, a memory for storing first- and second-system signals as outputs from the A/D conversion means, addition means for adding the first- and second-system signals sequentially read out from the memory, and outputting a line sequential color difference signal, first inversion means for inverting a polarity of the first-system signals sequentially read out from the memory, second inversion means for inverting a polarity of the second-system signals sequentially read out from the memory, first selection means for switching and selecting the first-system signals sequentially read out from the memory and outputs from the first inversion means in units of pixels, second selection means for switching and selecting the second-system signals sequentially read out from the memory and the outputs from the second inversion means in units of pixels, first decoding means for decoding the outputs from the first selection means, second decoding means for decoding the outputs from the second selection means, and addition means for adding the outputs from the first and second decoding means and outputting a luminance signal.

(4) A digital signal process apparatus comprises encoding means for forming a signal corresponding to a difference between signals from adjacent pixels, and A/D-converting the difference signal, a memory for storing the output from the encoding means, means for forming a color difference signal o the basis of the output from the memory, and means for decoding the output from the memory to form a luminance signal.

With the arrangement (3) or (4), digital processes such as A/D conversion can be performed with a smaller number of bits, and luminance signal data and line sequential color difference signals can be obtained from pixel signals obtained by a single exposure operation while using a sensor for a movie camera.

In order to achieve the above objects, according to still another embodiment of the present invention, a signal process apparatus comprises the following arrangement (5):

(5) A signal process apparatus comprises a plurality of sets of channels each of which includes means for sampling and holding signals from pixels which are spatially adjacent to each other and have the same color filters, and DPCM-type A/D conversion means for A/D-converting a difference between outputs from the means.

With the above arrangement, an arithmetic time of each channel can be prolonged by the number of channels as compared to a case with only one channel.

Other objects and features of the present invention will be apparent from the following description taken in conjunction with the accompanying drawings.

BRIEF DESCRIPTION OF THE DRAWINGS

FIG. 1 is a block diagram of the prior art;
FIGS. 2A to 2C show color filter matrices of a CCD sensor;
FIG. 6 is a block diagram of a reproduction apparatus;
FIG. 7 is a block diagram of a decoder 602;
FIGS. 9A and 9B show vertical stripe color filters used in the third embodiment of the present invention;
FIGS. 10A and 10B are block diagrams showing the fourth embodiment of the present invention;
FIG. 19 is a block diagram showing the seventh embodiment of the present invention;
FIG. 20 shows a color filter matrix used in the seventh embodiment.

DETAILED DESCRIPTION OF THE PREFERRED EMBODIMENTS

The preferred embodiments of the present invention will now be described in detail.

(First Embodiment)

Figure 3:
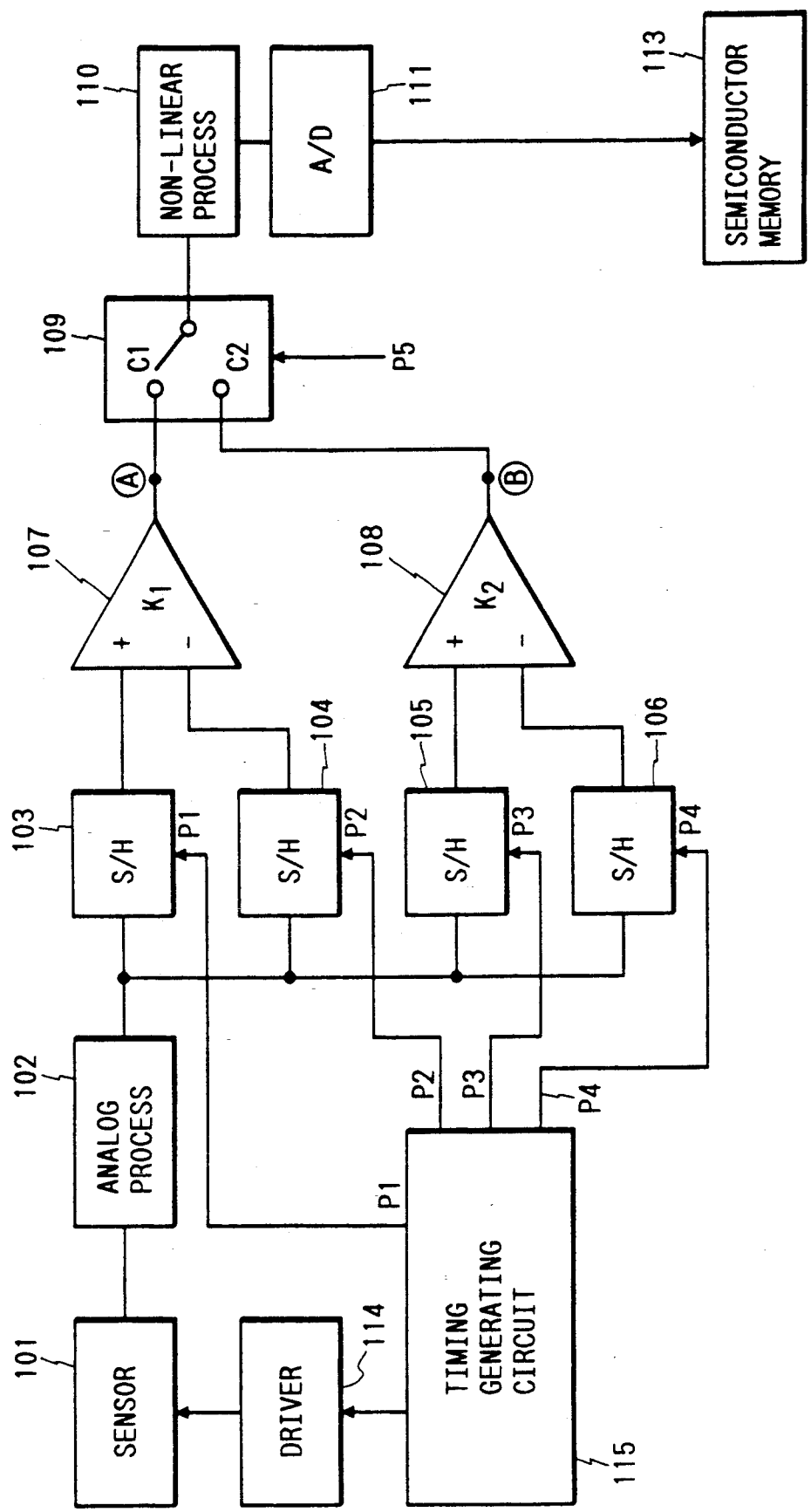
FIG. 3 is block diagram showing the first embodiment of the present invention.

FIG. 3 is a block diagram of an "electronic still camera" according to the first embodiment of the present invention. In FIG. 3, complementary color filters shown in, e.g., FIG. 2A are formed on a sensor 101. The sensor 101 is driven by interlaced scanning by a driver 114.

Figure 4:
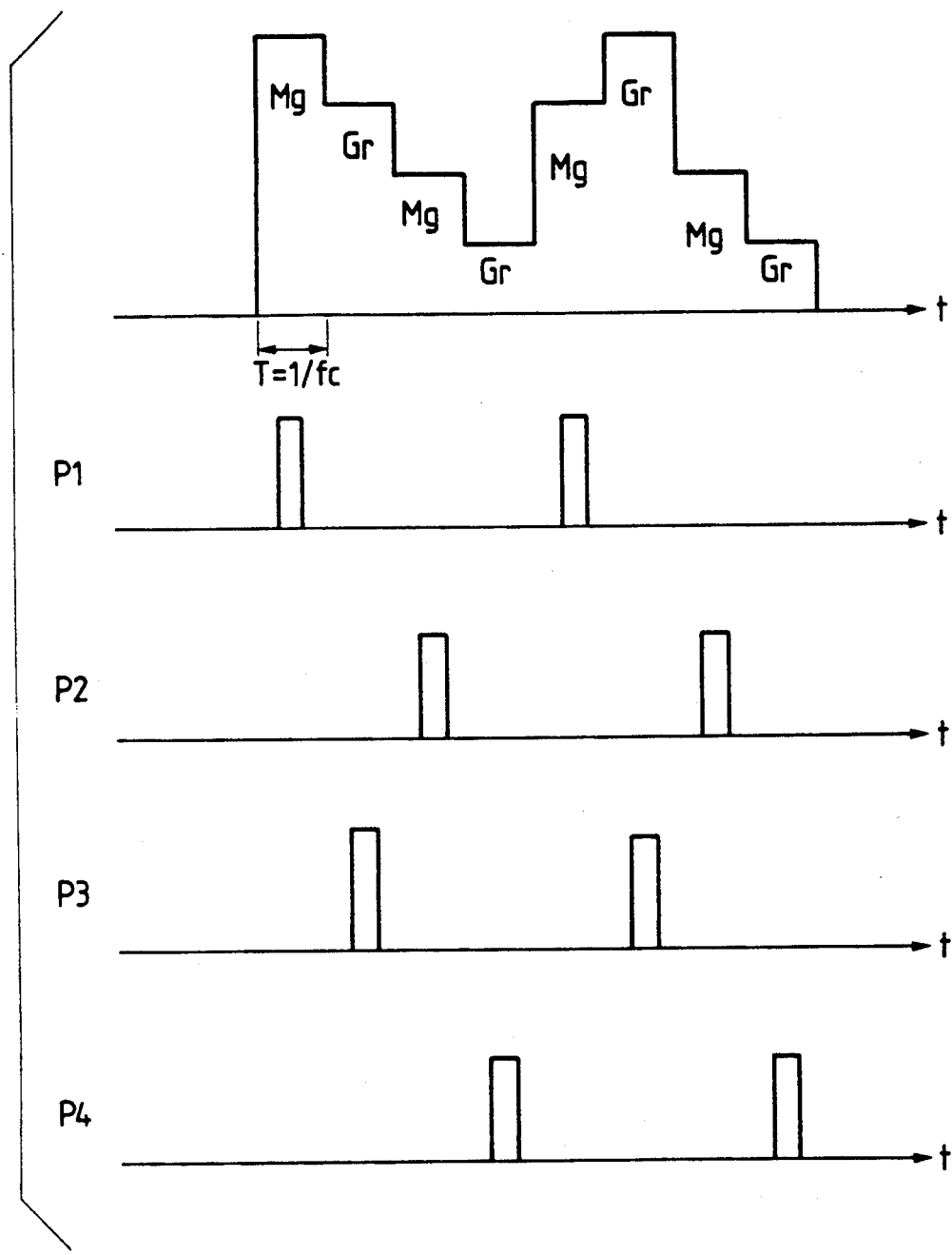
FIG. 4 is a timing chart of pulses input to S/Hs 103 to 106.

A signal read out from the sensor 101 is subjected to necessary video signal processes such as a CDS process, a clamp process, a blanking process, and the like in an analog process unit 102, and the processed signal is input to four sample & hold circuits (S/Hs) 103, 104, 105, and 106. The four S/Hs sample and hold their inputs in response to pulses P1, P2, P3, and P4 at timings shown in FIG. 4. As can be seen from FIG. 4, the pulses P1, P2, P3, and P4 have a period of $4\times(1/fc)$ (where fc is the horizontal transfer clock frequency), and correspond to phases 0°, 180°, 90°, and 270°, respectively. Therefore, in a horizontal scanning period including Mg (magenta) and Gr (green) signals, the S/H 103 samples and holds odd-numbered Mg signals, and the S/H 104 samples and holds even-numbered Mg signals. The same applies to the S/Hs 105 and 106, except that Mg signals are replaced with Gr signals. A differential amplifier 107 amplifies a difference between the output from the S/H 103 and the output from the S/H 104 with a gain $K_1$.

Similarly, a differential amplifier 108 amplifies a difference between an output from the S/H 105 and an output from the S/H 106 with a gain $K_2$. A switch 109 alternately switches output terminals C1 and C2 of the amplifiers 107 and 108 for a period (1/fc).

Figure 5:
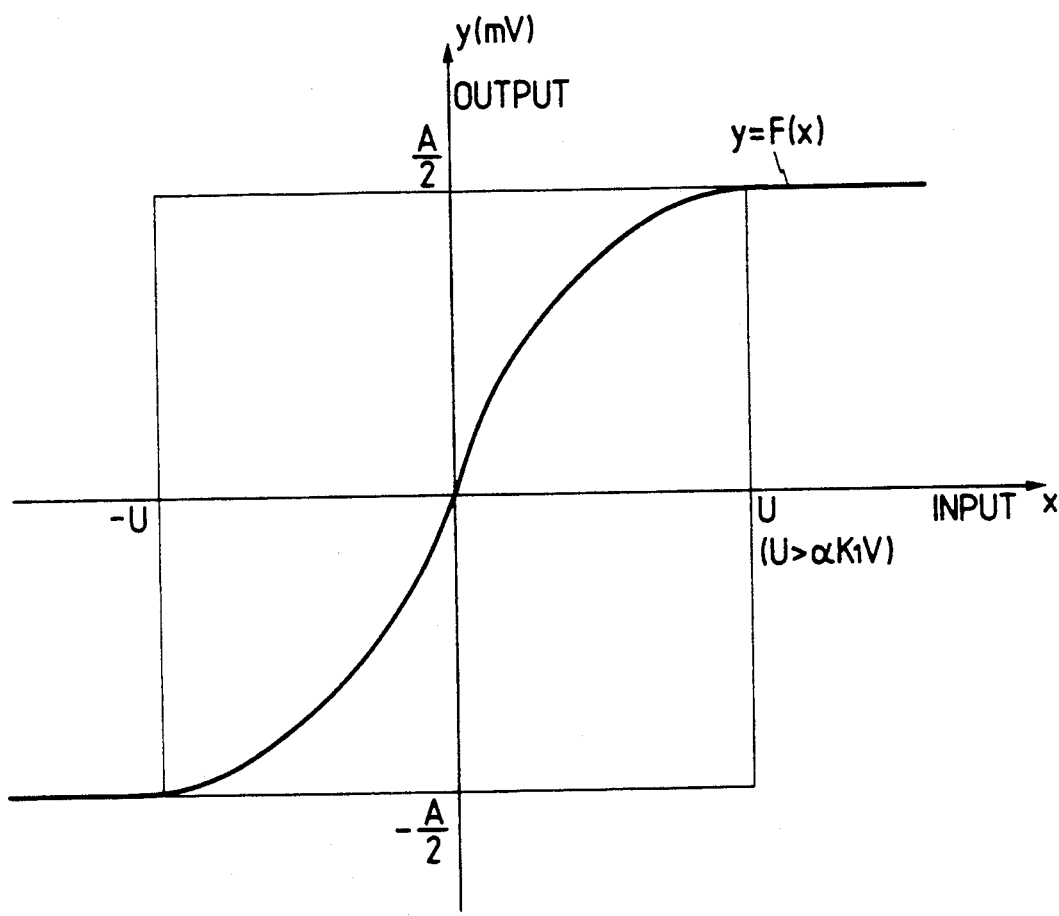
FIG. 5 is a graph showing I/O characteristics of a non-linear process unit 110.

In a non-linear process unit 110, an output from the switch 109 is subjected to a non-linear process having I/O characteristics shown in FIG. 5, and the processed signal is A/D-converted into 6-bit data by an A/D converter 111. The I/O characteristics shown in FIG. 5 are preferably determined as follows. An output signal from the switch 109 is represented by x, and a probability density function of x is represented by $P(x)$.

At this time, as described in, e.g., J. Max "Quantizing for minimum distortion" (IRE Trans. Information Theory vol. IT-6, pp. 7–12, March 1960), input characteristics $y = F(x)$ for minimizing a quantization error can be given by:

$$F(x) = A\left[\int_{-U}^{x} [P(x)]^{\frac{1}{3}}dx / \int_{-U}^{U} [P(x)]^{\frac{1}{3}}dx\right] - \frac{A}{2}$$

In this case, U is positive, and is a minimum one which satisfies $-U < x < U$, and a conversion range of the next A/D converter 111 corresponds to $-(A/2)$ to $(A/2)$ mV. Of course, an output from the non-linear process unit must be clipped to $-(A/2)$ to $(A/2)$ mV.

When the number of bits of the A/D converter 111 is relatively large, e.g., 6 to 8 bits, the non-linear process unit 110 need not particularly perform the above-mentioned non-linear process, and may perform only the clip process.

The A/D converter 111 is a 6-bit A/D converter, and quantizes a conversion range of $-(A/2)$ to $(A/2)$ to 64 ($2^6$) steps, i.e., converts an input within a range of $-A/2$ to $-A/2+\Delta$ to 0 and converts an input within a range of $(A/2-\Delta)$ to $(A/2)$ mV to 63.

In this case, $\Delta = A/64$ mV.

Of course, a level shifter or the like may be arranged below the A/D converter 111 to set an input range of 0 to A mV.

Assume that a maximum output value of the S/Hs 103 and 104 is represented by V. A possible output range of the differential amplifier 107 corresponds to a range of $-K_1V$ to $K_1V$ mV.

However, although outputs at a point A are separated by one pixel in the horizontal direction, since a difference between signals from the same color filters have a high correlation, the output from the differential amplifier 107 almost falls within a range of $-\alpha K_1V$ to $\alpha K_1V$ mV. $\alpha$ is almost zero, and is substantially obtained by subtracting a correlation function from 1. Therefore, $\alpha$, $K_1$, V, and A must satisfy a relation of $\alpha K_1 V < U$. Outputs at the point A often become smaller than $-\alpha K_1 V$ or larger than $\alpha K_1 V$ although a frequency is low. In this case, since these outputs are clipped by the clip characteristics shown in FIG. 5, a clip error occurs. Such a phenomenon should be avoided as much as possible, and for this purpose, $\alpha K_1$ is preferably as small as possible.

Contrary to this, as for equivalent quantization precision of non-clipped A/D-converted data, $K_1$ is preferably large to some extent.

Therefore, the fact that the correlation coefficient is large and $\alpha$ can be decreased leads to advantages in that $\alpha K_1$ can be decreased even if $K_1$ is relatively large, an error caused by the clip characteristics can be eliminated, and fine quantization precision can also be set. In practice, when the correlation coefficient R is about 0.95, it can be considered that $\alpha$ is about 0.05. If $\alpha = 0.125$ with a small margin and $K_1 \simeq (U/2)\cdot(4/V)$ are set, 9-bit precision data can be equivalently obtained using a 6-bit precision A/D converter. The same applies to $K_2$. In practice, $K_1 = K_2 \simeq 4$ is preferable.

Finally, the A/D-converted data is directly written from the output terminal of the camera main body into the semiconductor memory (storage body) 113 which is detachable from the main body.

The capacity of this semiconductor memory 113 will be examined below. If the number of pixels of the sensor 101 is assumed to be $768 \times 512$ (pixels), when A/D conversion is simply performed by 9 bits, a 9-bit A/D converter is necessary, and a capacity of $768 \times 512 \times 9 = 3.5$ Mbits is necessary. However, according to this embodiment, almost equivalent image quality can be obtained by the 6-bit A/D converter 111, and a capacity can be reduced to as small as $768 \times 512 \times 6 = 2.3$ Mbits (about 65%). If a 4-bit A/D converter is used, a capacity can be $768 \times 512 \times 4 = 1.57$ Mbits.

Furthermore, data may be converted to a variable length code by Huffman coding to obtain higher compression efficiency.

The storage body of the present invention is not limited to the semiconductor memory 113 but may be incorporated in the main body.

FIG. 6 shows a reproduction apparatus. Image data compressed and written in the detachable semiconductor memory 113 in a system shown in FIG. 3 is decoded to an original signal by a decoder 602, and is subjected to a video signal process by a video signal process unit 603 to be converted into a digital standard television signal. The digital signal is D/A (digital-to-analog) converted to a standard television signal by a D/A converter 604.

The decoder 602 executes processes shown in FIG. 7. That is, an inverse conversion unit 701 executes inverse conversion of the above-mentioned non-linear process for the readout digital data. This conversion is executed by employing a table conversion scheme. A switch 703 switches an output from the unit 701 and an output obtained by inverting the output from the unit 701 by an inverter 702. Data written in the procedure shown in FIG. 3 will be examined below. First, an output from the sensor 101 in units of pixels is represented by $X_n$. $X_n$ corresponds to a sensor output for $t_n = n(1/fc)$ sec.

As outputs at the point A in FIG. 3, $(X_{4k+1} - X_{4k+3})$ and $(X_{4k+5} - X_{4k+3})$ are alternately output, and as outputs at a point B, $(X_{4k+2} - X_{4k+4})$ and $(X_{4k+6} - X_{4k+4})$ are alternately output.

Therefore, information $U_n$ to be written in the semiconductor memory 113 corresponds to data (non-linear converted data) given by:

$$\begin{matrix} X_1 - X_3 \\ X_2 - X_4 \\ X_5 - X_3 \\ X_6 - X_4 \\ \vdots \end{matrix} \quad (1)$$

An output $U_n$ from the inversion conversion unit 701 obtained by reading out these data are given by:

$$\begin{matrix} U_1 = X_1 - X_3 \\ U_2 = X_2 - X_4 \\ U_3 = (-1) \times (X_3 - X_5) \\ U_4 = (-1) \times (X_4 - X_6) \\ \vdots \end{matrix} \quad (2)$$

That is, we have:

$$\begin{matrix} U_n = (X_n - X_{n+2}) \\ \text{for } n = 4m + 1, 4m + 2 \\ U_n = -(X_n - X_{n+2}) \\ \text{for } n = 4m + 3, 4m + 4 \end{matrix} \quad (3)$$

Therefore, if an inverted output is selected when the number n of readout pixels is $4m+1$ or $4m+2$, the output $V_n$ is given by:

$$V_n = X_{n+2} - X_n \quad (4)$$

An adder 704 adds its input and data obtained by delaying its own output by two steps by a delay 705.

Therefore, this output $Y_n$ is given by:

$$\begin{matrix} Y_n = Y_{n-2} + V_n \\ = Y_{n-2} + X_{n+2} - X_n \end{matrix} \quad (5)$$

Therefore, we have:

$$Y_n = X_{n+2} \quad (6)$$

An original signal $X_n$ is decoded and appears at the output of the adder 704. Necessary signal processes such as a clamp process, a $\gamma$-conversion process, a luminance/color difference separation process, and the like are executed on the basis of the decoded original signal, thus obtaining a desired video output.

In the above description, a case has been exemplified wherein signals are read out from the CCD having a color filter matrix shown in FIG. 2A by interlaced scanning. However, the present invention is effective in a case wherein signals are read out from the CCD having a color filter matrix shown in FIG. 2B by interlaced scanning.

In this case, however, in order to finally obtain a video signal during reproduction, a field memory is required. This arrangement can advantageously eliminate false signals in the vertical direction.

(Second Embodiment)

Figure 8:
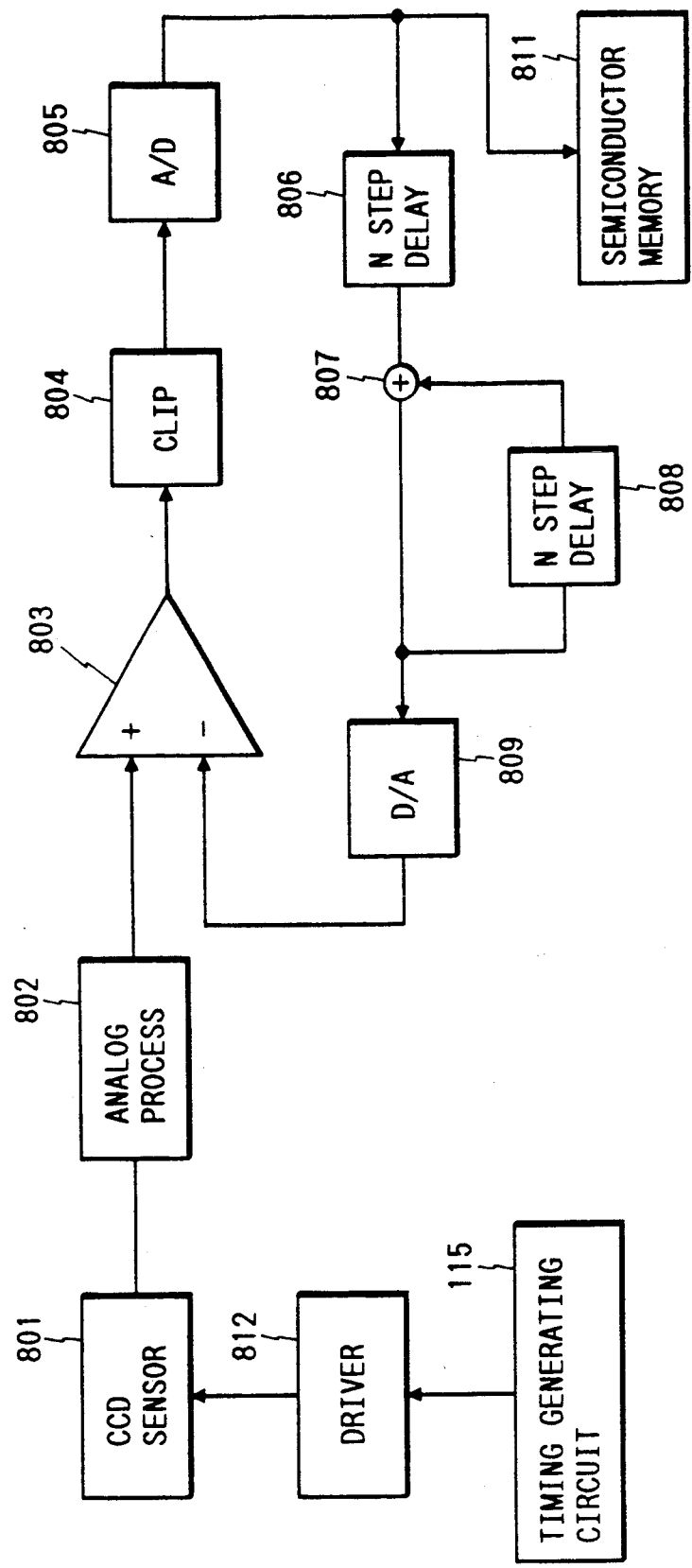
FIG. 8 is a block diagram showing the second embodiment of the present invention.

FIG. 8 is a block diagram of an "electronic still camera" according to the second embodiment of the present invention.

The first embodiment employs a differential encoding means for obtaining a difference between signals from pixels of the same kind of color filters by a feed-forward scheme. However, this embodiment employs a differential encoding means to be inserted in a feedback loop of a decoder, thus preventing an influence of an error caused by a clip circuit 804 and an A/D converter 805.

In this case, it is preferable that an inversion process corresponding to the inverter 702 and the switch 703 can be omitted. Delay times of delays 806 and 808 correspond to clocks for two pixels in the horizontal direction, and it is preferable, as compared to one pixel, since a difference between pixels having a high correlation coefficient in the same color can be obtained. In addition, since a period in a loop can be twice that for one pixel, a requirement for an arithmetic speed in the loop can be relaxed.

The arrangement shown in FIG. 8 will be described below. A differential amplifier 803 amplifies a difference between the output from an analog process unit 802 which is the same as that in the first embodiment, and a D/A-converted feedback signal corresponding to the same kind of color filter two pixels before. A clip circuit 804 executes a clip process for suppressing an output to a range of $-A/2$ to $A/2$. A non-inverting input to the differential amplifier 803 is represented by $X_n$, and its inverting input is represented by $W_n$. The A/D converter 805 is, e.g., an 8-bit converter, and its output $S_n$ includes a clip error and a quantization error and is given by:

$$S_n = (X_n - W_n) + q_n \quad (7)$$

Therefore, $$W_n = S_{n-2} + W_{n-2} \quad (8)$$

When equations (7) and (8) are Z-converted, we have:

$$\begin{matrix} S(Z) = X(Z) - W(Z) + Q(Z) \\ W(Z)(1 - X^{-2}) = Z^{-2} S(Z) \end{matrix} \quad (9)$$

When $W(Z)$ is eliminated, the above equations can be rewritten as:

$$S(Z) = (1 - Z^{-2})[X(Z) + Q(Z)] \quad (10)$$

Therefore, information given by the following equation is written in a semiconductor memory 811:

$$S_n = X_n + Q_n - (X_{n-2} + Q_{n-2})$$
$$= (X_n - X_{n-2}) + (Q_n - Q_{n-2}) \quad (11)$$

The second term is small since it represents a clip error and a quantization error, and almost corresponds to a difference between signals like in the first term. When this value is reproduced by the latter half (704 and 705) of the decoder shown in FIG. 7, since a transfer function of this portion is:

$$\frac{1}{1 - Z^{-2}} \quad (12)$$

then the extracted signal is given by:

$$X(Z) + Q(Z) \quad (13)$$

Therefore, the influence of an error can be prevented, and an original signal can be extracted.

(Third Embodiment)

Figures 9A, 9B:
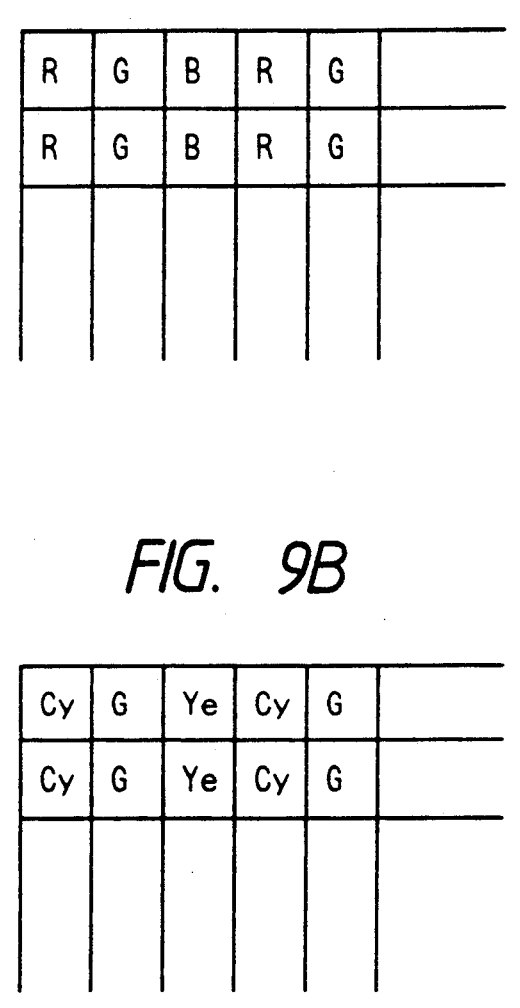

When a sensor provided with vertical stripe color filters shown in FIGS. 9A and 9B is used, the present invention can be effectively carried out with the arrangement shown in FIG. 8.

In this case, delays 806 and 808 can have a delay time corresponding to three horizontal pixels.

In each of the above embodiments, a differential encoding means for quantizing a difference between signals from pixels of the same kind of adjacent color filters is used. However, the present invention is not limited to this. For example, a difference between signals from horizontally or vertically adjacent pixels may be quantized.

As described above, according to the first to third embodiments of the present invention, a difference between signals from adjacent pixels in a solid-state image pickup element is quantized and encoded, and is then recorded in a storage body. Therefore, demodulated image quality free from quantization noise can be obtained without using an A/D converter having high bit precision. If a compression process is not particularly performed, since the output itself of the differential encoding means is already compressed, the number of images which can be stored in the storage body can be increased, resulting in great practical advantages.

In particular, according to the second embodiment of the present invention, since a correlation between signals from pixels between which a difference is to be calculated is very high, a better result can be obtained.

FIGS. 10A and 10B are block diagrams of a "signal process apparatus" according to the fourth embodiment of the present invention.

In FIGS. 10A and 10B, a sensor 101 comprises a CCD (charge-coupled device) image pickup element, and complementary color filters in a matrix shown in FIG. 2C are attached thereto. This matrix is originally used for a movie camera, so that data for two lines are simultaneously read out, and the first (odd) and second (even) fields are read out to be vertically offset by one pixel.

In this embodiment, however, data for one line is read out by interlaced scanning.

Outputs from the sensor 101 are sampled by S/Hs 116 and 117. Signals $\phi_1$ and $\phi_2$ for giving sampling timings have a 180° phase difference therebetween, as shown in FIG. 11 and are used to cause sampling for every other pixel.

A difference signal is obtained by a differential amplifier 118, and its amplitude is limited by a limiter 119. Thereafter, the limited signal is converted into a digital signal by an A/D converter 120.

The output digital signal is switched for a 1V (vertical scanning) period by a switch 121. First-field (first-system) signals are stored in a field memory A 122, and second-field (second-system) signals are stored in a field memory B 123.

Figures 11, 12, 13:
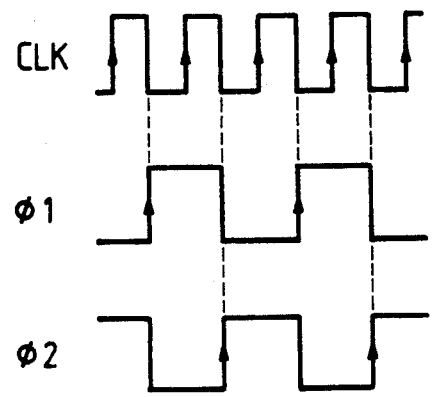
FIG. 11 is a timing chart showing sampling timings of a sensor output.
FIG. 12 shows a data format of a field memory A.
FIG. 13 shows a data format of a field memory B.

As a result, data are stored in the field memory A in a matrix shown in FIG. 12, and data are stored in the field memory B in a matrix shown in FIG. 13.

The data in the memories A and B are simultaneously read out therefrom one by one in a storage order. In the second field, read access of the field memory B is started from the second line.

As a result, a sum output of an odd-numbered line of the first field and an even-numbered line of the second field from an adder 124 is given by:

$$(Ye - Cy) + (Mg - G) = 2R - G \approx R - Y$$

A sum output of an even-numbered line of the first field and an odd-numbered line of the second field is given by:

$$(Ye - Cy) + (G - Mg) = G - 2B \approx -(B - Y)$$

In this manner, line sequential color difference components can be obtained.

The outputs from the adder 124 are input to a switch 139 with and without going through an inverting amplifier 138. The switch 139 can switch the outputs from the adder 124 and the inverting amplifier 138 every 1H, thus obtaining outputs R-Y, B-Y, . . . These outputs are supplied to a D/A converter 125 and a low-pass filter 126, thus obtaining analog chrominance signals C.

Data output from the memories A and B are also input to inverting amplifiers 127 and 128, and outputs from these amplifiers are switched by switches 129 and 130 for every data, i.e., every pixel, thus alternately outputting inverted and non-inverted data. As a result, if original data in the horizontal scanning direction are $X_0, X_1, X_2, \ldots$, outputs from the memories A and B are $X_0, X_0-X_1, X_2-X_1, X_2-X_3, X_4-X_3, X_4-X_5, \ldots$, and outputs from the switches 129 and 130 are $X_0, X_1-X_0, X_2-X_1, X_3-X_2, X_4-X_3, X_5-X_4, \ldots$ These outputs are decoded by adders 131 and 132, and delay circuits 133 and 134, thereby outputting original outputs $X_0, X_1, X_2, \ldots$ in turn. Furthermore, these outputs are added by an adder 135 to output Ye+Mg, G+Cy, Ye+Mg, G+Cy, . . . in the odd-numbered lines of both the first and second fields, and to output Ye+G, Cy+Mg, Ye+G, Cy+Mg, . . . in the even-numbered lines thereof.

These outputs are then converted into analog signals by a D/A converter 136, and the analog signals are then filtered by a low-pass filter 137, thereby outputting components given by:

$$Y_3 + Mg + Cy + G = 2R + 3G + 2B \approx Y$$

As a result, an analog luminance signal Y can be obtained.

In this embodiment, these operations are executed by hardware control, but may be attained by software control.

The color separation filters attached to the sensor 101 may have other matrices.

As can be apparent from the above description, according to the fourth embodiment of the present invention, the following effects can be provided:

a. A still image can be obtained by a sensor for a movie camera, to which complementary color filters are attached. For this reason, there is no need to use special-purpose filters, and development cost can be reduced.

b. A difference between different color signals of adjacent pixels of an image pickup element is calculated, and is then A/D-converted, so that the number of bits of digital processes including A/D conversion can be decreased. In other words, quantization noise for a given number of bits can be reduced. As a result, low cost and high image quality can be attained at the same time.

Figure 14:
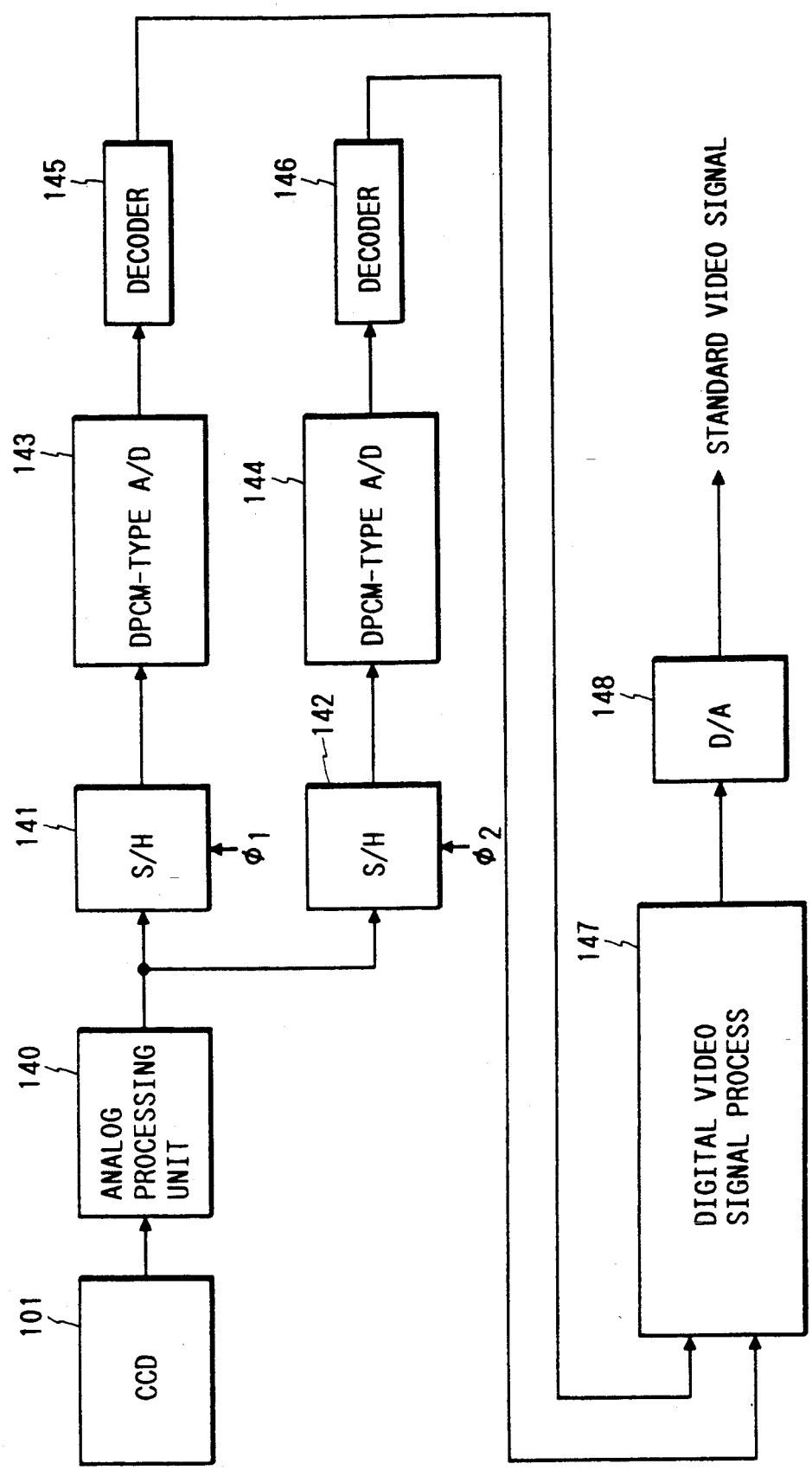
FIG. 14 is a block diagram showing the fifth embodiment of the present invention.

FIG. 14 is a block diagram of a "signal process apparatus for a digital video camera" according to the fifth embodiment of the present invention. This embodiment has as its object to solve the drawback in FIG. 8. That is, in the arrangement shown in FIG. 8, when the number of horizontal pixels of an image pickup element is increased to obtain high-resolution image quality, a clock frequency per pixel is increased, and arithmetic operations in a feedback loop must be executed at higher speed, resulting in an increase in cost of an apparatus as a whole.

For example, when the number of effective pixels in the horizontal direction is set to be 768, a high resolution of about 450 to 480 (TV) can be realized, but a clock of about 4 $f_{sc}$ (14.32 MHz) is required. For this purpose, all the arithmetic operations in the feedback loop shown in FIG. 8, i.e., a sum of process times necessary for the A/D converter 805, the adder 807, and the D/A converter 809 must fall within about 70 nsec. This results in an increase in cost of the apparatus, or makes its design difficult.

This embodiment is characterized by comprising a plurality of sets of channels each of which comprises a means for sampling and holding signals from spatially adjacent pixels to which the same color filters are attached, and a DPCM-type A/D conversion means for A/D-converting a difference between outputs from the means. This embodiment will be described in detail below. Complementary color mosaic filters shown in FIG. 2A are attached onto a CCD (charge-coupled device) image pickup element 101, and data are read out therefrom by interlaced scanning in units of horizontal lines by a timing generator and a driver (neither are shown). More specifically, in odd-numbered scanning, Mg (magenta) and Gr (green) signals are alternately read out, and in the even-numbered scanning, Cy (cyan) and Ye (yellow) signals are alternately read out. These signals are then subjected to, e.g., a corrected double sampling process, a preknee process, and the like in an analog process unit 140, and the processed signals are then input to two S/Hs 141 and 142. Timing pulses $\phi_1$ and $\phi_2$ for the two S/Hs 141 and 142 have a 180° phase difference therebetween. For example, when a line including Mg (magenta) and Gr (green) signals is scanned, one S/H 141 outputs Mg signals, and the other S/H 142 outputs Gr signals. When a line including Cy and Ye signals is scanned, the S/H 141 outputs Cy signals, and the S/H 142 outputs Ye signals. These outputs ar input to DPCM (differential pulse code modulation) type A/D converters 143 and 144 (to be described later).

Figure 15:
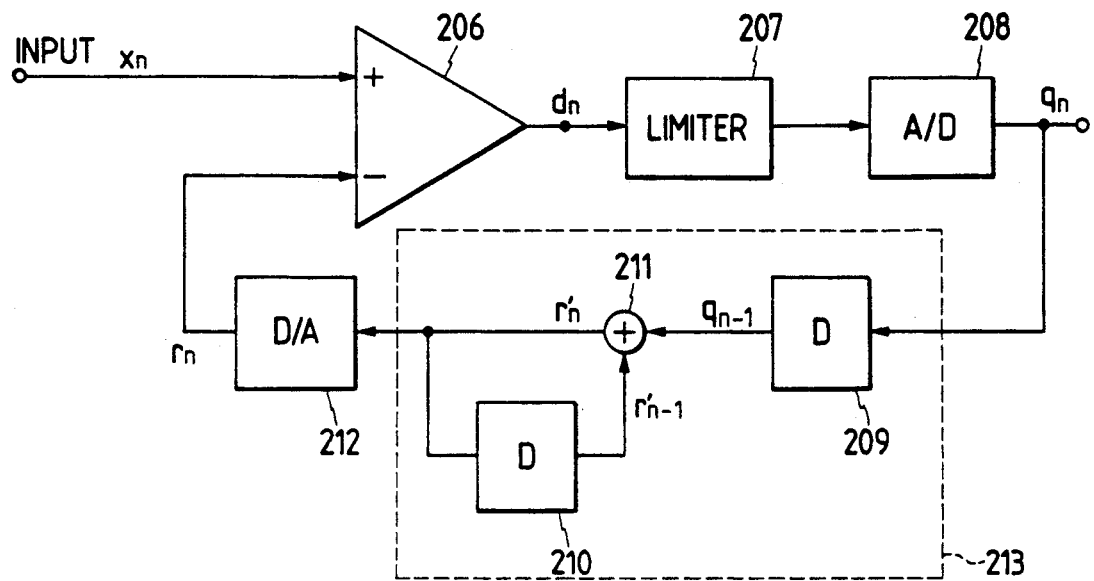
FIG. 15 is a block diagram of a DPCM-type A/D converter used in the fifth embodiment.

FIG. 15 shows an arrangement of the DPCM-type A/D converters 143 and 144.

The principle of operation will be described below with reference to FIG. 15.

Assume that an input signal is represented by $\{X_n\}$, an output from a differential amplifier 206 is represented by $d_n$, and an output from a D/A converter 212 is represented by $\{r_n\}$. Since input signals are changed every S/H pulse $\phi_1$, if the clock per pixel of the CCD 101 is 14.32 MHz (period: 70 nsec), $\{X_n\}$ is a signal which changes 140 nsec twice the clock period.

$$d_n = X_n - r_n \tag{14}$$

Assume that an output from an A/D converter 208 is represented by $\{q_n\}$. A sum of a limit error of a limiter 207 and a quantization error of the A/D converter 208 is represented by $e_n$. That is, the output from the A/D converter is given by:

$$q_n = d_n + e_n \tag{15}$$

Therefore, an output from an adder 211 through a delay element 209 is represented by $\{r'_n\}$, it is given by:

$$r'_n = q_{n-1} + r'_{n-1} \tag{16}$$

Assuming that an operation of the D/A converter 212 is ideal, $r_n$ is expressed by:

$$r_n = r'_n \tag{17}$$

From the above equations (14), (15), (16), and (17), we have:

$$r_n = d_{n-1} + e_{n-1} + r_{n-1} \tag{18}$$

$$d_n = X_n - r_n \tag{19}$$

Equations (18) and (19) are Z-converted as follows:

$$R(Z) = (D(Z) + E(Z))Z^{-1} + Z^{-1}R(Z) \tag{20}$$

$$D(Z) = X(Z) - R(Z) \tag{21}$$

When $D(Z)$ is eliminated from equations (20) and (21), we have:

$$R(Z) = [X(Z) + E(Z)]Z^{-1} \tag{22}$$

Thus, $\{r_n\}$ can be regarded as the input signal $\{X_n\}$ if the error $\{e_n\}$ is small, and the error $\{e_n\}$ is not transmitted. Decoders 145 and 146 connected in the following stage may have the same arrangement as that of a portion 213 surrounded by a dotted line in FIG. 15.

Figure 16:
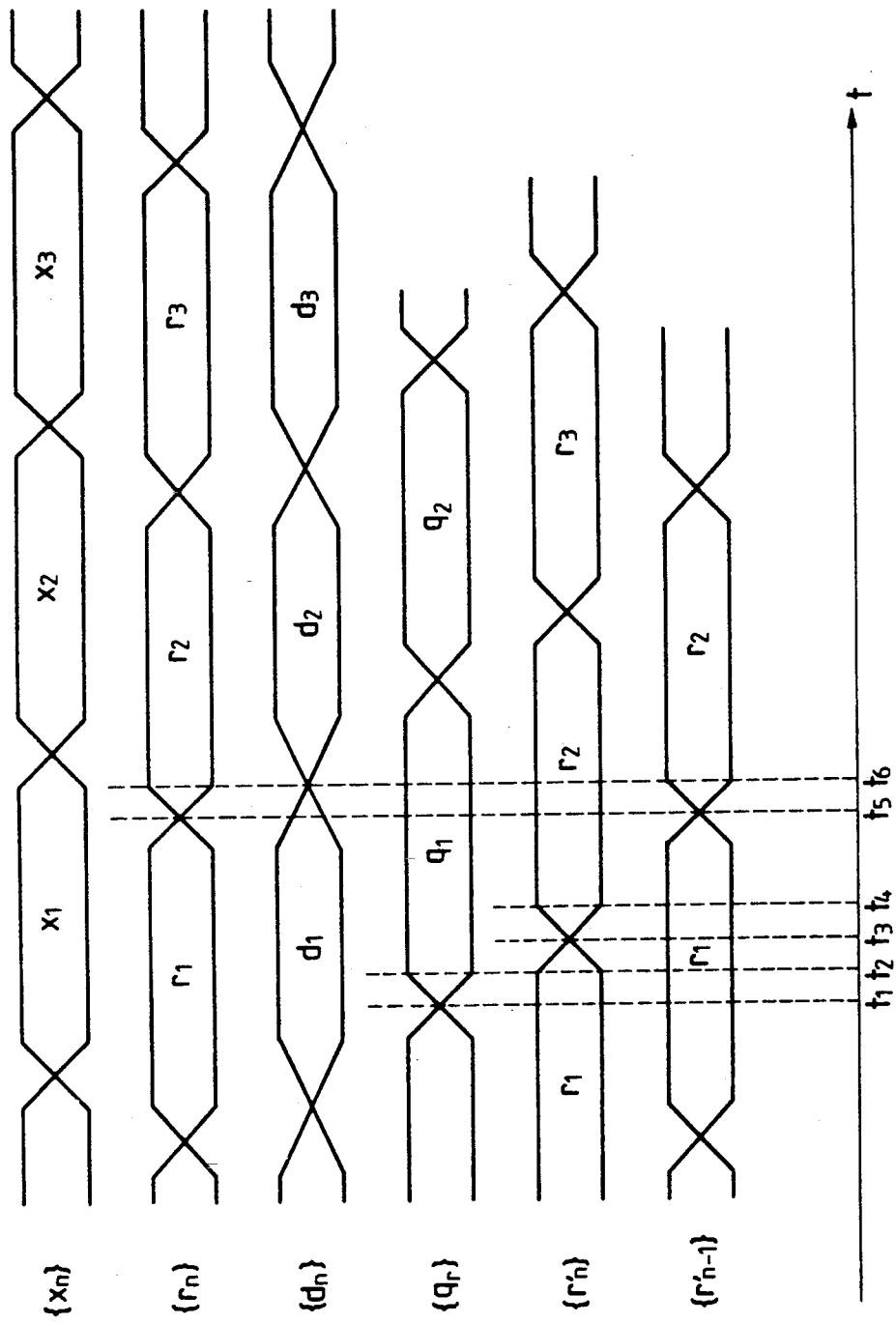
FIG. 16 is a timing chart of the DPCM-type A/D converter.

In a practical arrangement, when timings are taken, as shown in FIG. 16, the delay element 209 can be omitted. A delay element 210 may comprise a data latch.

In FIG. 16, $t_1$ and $t_2$ respectively indicate A/D operation start and end timings of the A/D converter 208, $t_3$ and $t_4$ respectively indicate addition start and end timings of the adder 211, and $t_5$ and $t_6$ respectively indicate D/A operation start and end timings of the D/A converter 212.

The respective operations are designed to be made in synchronism with the fundamental clock. If a delay time for synchronizing this clock in the feedback loop is represented by $T_S$, an allowable range of an arithmetic time in the feedback loop can fall within:

$$T_S+(t_2-t_1)+(t_4-t_3)+(t_6-t_5)<140 \text{ nsec}$$

As compared to a 1-channel arrangement (<70 nsec), design can be greatly facilitated.

Figure 17:
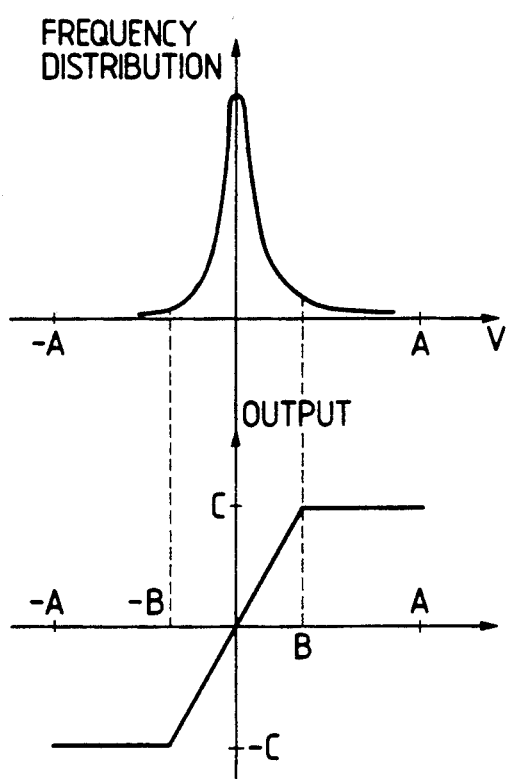
FIG. 17 is a graph for explaining an operation of the DPCM-type A/D converter.

The differential amplifier 206 outputs a difference between the input signal $\{X_n\}$ and the output $\{r_n\}$ from the D/A converter 212. In this case, the output from the amplifier 206 suffers from very small dispersion, and has a distribution as shown in an upper portion in FIG. 17 since it has a high correlation with inputs and a signal from an immediately preceding color filter in the same color. Therefore, if I/O characteristics of the limiter 207 are set as shown in a lower portion of FIG. 17, an error caused by the limiter 207 can be minimized. Then, a voltage is converted to fall within a range of $\pm C$, and is then A/D-converted by the A/D converter 208.

With this arrangement, even when, e.g., an 8-bit A/D converter is used, precision corresponding to 10 to 12 bits can be obtained. Note that an input to the A/D converter 208 may be converted within a range of 0 to 2C V through an appropriate level shifter.

The bit precision of the adder 211 and the D/A converter 208 is preferably set to be larger by 1 to 2 bits than that of the A/D converter 208.

In FIG. 14, the outputs from the decoders 145 and 146 are digital Mg, Gr, Cy, and Ye signals which are quantized with high precision, and are input to the digital video signal process unit 147. Processes in this unit may be conventional ones. For example, the Mg, Gr, Cy, and Ye signals are subjected to matrix calculations to be converted into R, G, and B signals, and thereafter, necessary video processes such as white balance correction, γ-correction, edge correction, and the like are performed. The processed signals are temporarily converted into color difference signals, the color difference signals are converted into digital signals, and a sync signal is added to the digital signals, thus generating digital standard video signals. The digital signals are then D/A-converted by the D/A converter 148.

In the above description, the CCD 101 to which the color filters shown in FIG. 2A are attached is not subjected to a vertical two-pixel mixing read mode, but is subjected to an interlaced read mode in units of lines. In addition, the present invention is also effective when the CCD 101 to which color filters shown in FIG. 2B are attached is subjected to an interlaced vertical two-pixel read mode.

In this case, in place of four signals, i.e., Mg, Gr, Cy, and Ye signals, four (Mg+Cy), (Gr+Ye), (Mg+Ye), and (Gr+Cy) signals are read out. The present invention can be carried out in this case. Although a vertical resolution is slightly degraded, flicker can be eliminated, and no luminance error occurs.

Figure 18:
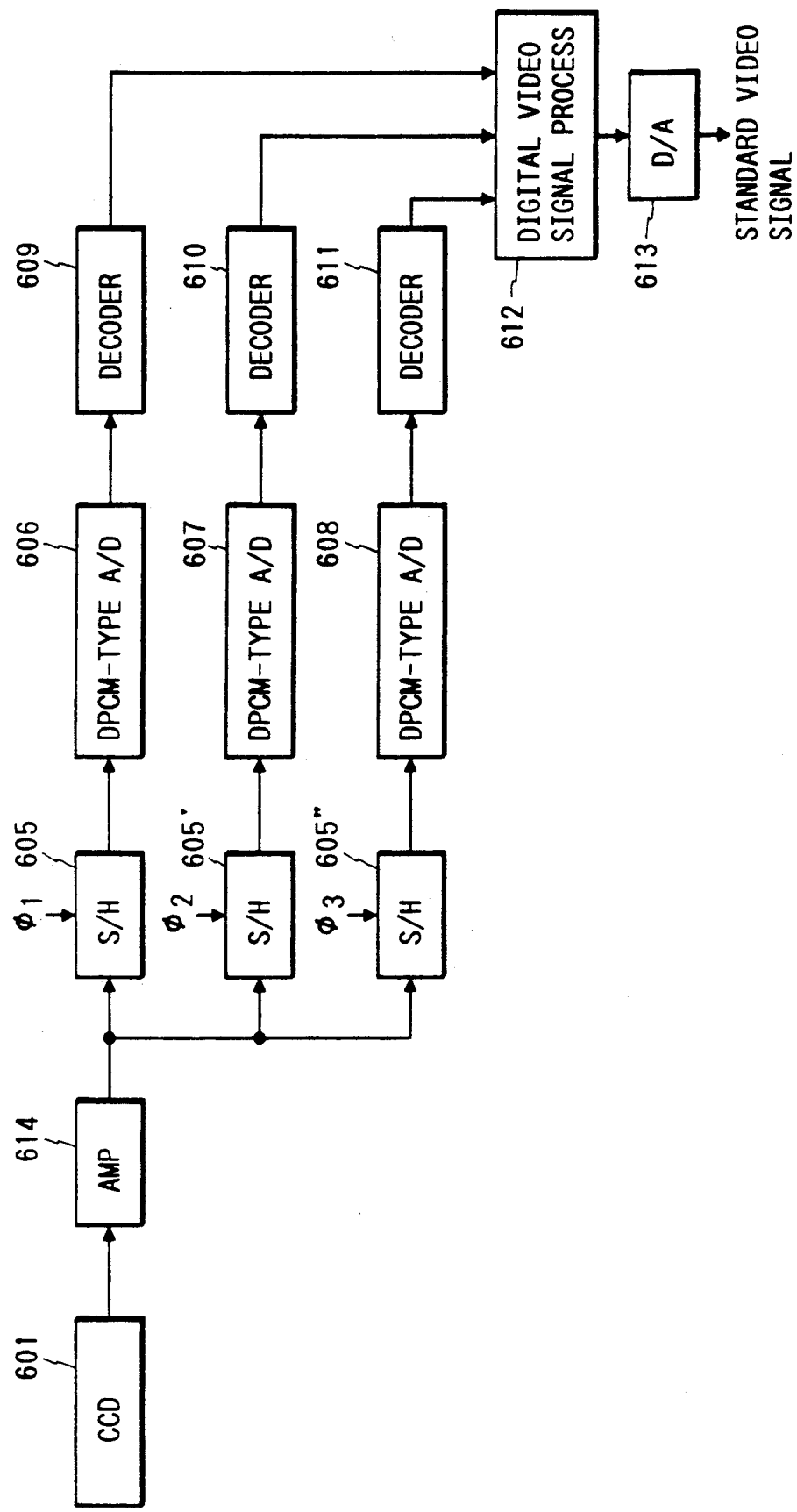
FIG. 18 is a block diagram showing the sixth embodiment of the present invention.

FIG. 18 is a block diagram of a "signal process apparatus for a digital video camera" according to the sixth embodiment of the present invention.

Pure color or complementary color stripe filters shown in FIG. 9A or 9B are arranged on a CCD image pickup element 601. In this case, three channels of DPCM-type A/D converters (606, 607, 608), and decoders (609, 610, 611) with the above-mentioned arrangement are adopted. Three S/Hs 605, 605', and 605" sample and hold R, G, and B signals, or Cy, Gr, and Ye signals in response to pulses $\phi_1$, $\phi_2$, and $\phi_3$ which respectively have a 120° phase difference.

The digital video signal process unit 612 can employ any method as long as it is used in a process of a stripe filter method. Since a speed required for arithmetic operations in a feedback loop can be three times a case with a single channel, cost can be reduced although the number of channels is increased.

FIG. 19 is a block diagram of a "signal process apparatus for a digital video camera" according to the seventh embodiment of the present invention.

An image pickup element 1801 is, e.g., a MOS (metal oxide semiconductor) type image pickup element, and color filters in a matrix shown in FIG. 20 are attached thereto. When the MOS type element is used, four signals, i.e., W, Gr, Cy, and Ye signals can be simultaneously read out upon operation of vertical and horizontal registers (not shown).

Therefore, in this case, 4-channel DPCM-type A/D converters 1810 to 1813 are prepared, as shown in FIG. 19.

S/Hs 1806 and 1808 are operated in response to a pulse $\phi_1$, and S/Hs 1807 and 1809 are operated in response to a pulse $\phi_2$. The pulses $\phi_1$ and $\phi_2$ have a 180° phase difference therebetween.

Figure 21:
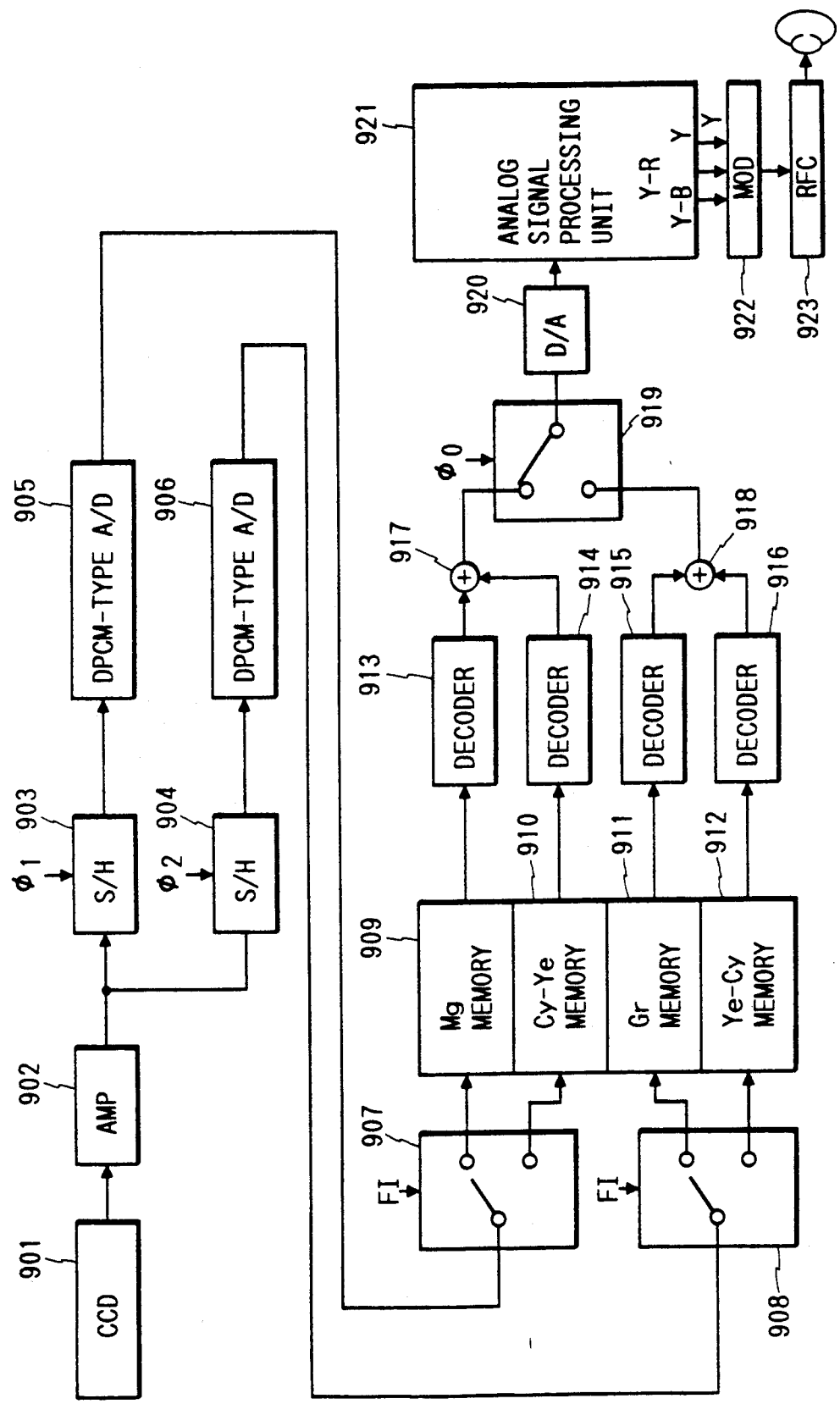
FIG. 21 is a block diagram showing the eighth embodiment of the present invention.

FIG. 21 is a block diagram of a "signal process apparatus for a still video camera" according to the eighth embodiment of the present invention.

In a still video camera, since an exposure operation is performed only once, if a CCD to which a color filter matrix shown in FIG. 2B is subjected to a vertical two-pixel mixing read mode to form a frame image, all the charges are read out in the first field, and the second field cannot be formed. Thus, a CCD 901 to which a color filter matrix shown in FIG. 2B is attached is subjected to read access in units of lines (without performing vertical two-pixel mixing). The readout data are temporarily A/D-converted into digital data, and the digital data are stored in a memory. Thereafter, a field image is formed by employing an addition method in the first and second fields. This embodiment is particularly effective for such an A/D conversion method.

An output from a DPCM-type A/D converter 905 is the above-mentioned $\{q_n\}$ which corresponds to a difference signal of Mg and Gr signals in the first field, a difference signal of Cy and Ye signals in odd-numbered lines of the second field, and a difference signal of Ye and Cy signals in even-numbered lines thereof.

Therefore, when a switch 907 is switched in units of fields, a difference signal of Mg is stored in a memory 909, and a difference signal of Cy or Ye is stored in a memory 910. Similarly, a difference signal of Gr is stored in a memory 911, and a difference signal of Ye or Cy is stored in a memory 912.

Therefore, the contents of these memories are read out to have the same address lines for the same period as $\phi_1$, and readout contents are input to decoders 913 to 916.

Since the decoders 913 to 916 have the same arrangement as that described above, original Mg, Gr, Cy, and Ye signals can be decoded. Therefore, the output from an adder 917 is (Mg+Cy), and an output from an adder 918 is (Gr+Ye). The outputs from these adders are alternately selected by a switch 919 in response to a pulse $\phi_0$, and the selected output is D/A-converted by a D/A converter 920, so that the analog signal is output. Since the pulse $\phi_0$ is the same as an original pixel read clock, the output from the D/A converter 920 is the same as that of the first field when the CCD 901 is subjected to an interlaced vertical two-pixel mixing read mode.

In a read mode of the next second field, read access is performed while the vertical addresses of the memories 909 and 910 are shifted by one line, so that the output from the adder 917 becomes (Mg+Ye) in turn. Similarly, when the addresses of the memories 911 and 912 are shifted by one line, the output from the adder 918 becomes (Gr+Cy). Therefore, the output from the D/A converter 920 is the same as that of the second field when the CCD 901 is subjected to an interlaced vertical two-pixel mixing read mode.

Therefore, when the obtained analog signal is input to an analog signal process unit 921, a luminance signal Y and color difference signals Y-R and Y-B necessary for recording signals in a floppy disk are obtained. Any analog signal process unit 921 may be employed as long as it corresponds to color filters shown in FIG. 2B which are conventionally integrated in an IC for a movie camera. Furthermore, these signals are modulated by a modulation unit 922, and then amplified by a recording amplifier 923. Thereafter, the amplified signals are recorded on a video floppy disk.

In this embodiment, a still video frame image can be formed by using a sensor for a movie camera, which sensor is provided with commercially available color filters shown in FIG. 2B, and an analog signal process IC also for a movie camera.

In each of the fifth to eighth embodiments, the outputs from the DPCM-type A/D converters for a plurality of channels may be directly written in a detachable semiconductor memory, so that a digital card camera can also be provided.

As described above, according to the fifth to eighth embodiments of the present invention, a feedback loop of a DPCM-type A/D converter can be constituted by elements having a relatively low arithmetic speed, thus realizing a low-cost, high-precision signal process apparatus.

What is claimed is:

1. An image pickup apparatus comprising:
   difference encoding means for quantizing a difference between signals from every other pixel in a solid-state image pickup element;
   non-linear processing means for non-linearly processing an output from said difference encoding means with a predetermined non-linear processing characteristic;
   A/D conversion means for A/D converting an output of said non-linear processing means with a predetermined conversion characteristic, said predetermined non-linear processing characteristic of said non-linear processing means being set according to said predetermined conversion characteristic of said A/D conversion means;
   an apparatus main body having an apparatus output terminal for supplying an output from said A/D conversion means; and
   a storage body capable of recording the output from said apparatus output terminal of said apparatus main body.

2. An apparatus according to claim 1, wherein said difference encoding means quantizes a difference between signals from a plurality of predetermined pixels in a horizontal direction.

3. An apparatus according to claim 1, wherein said storage body includes a memory which is detachable from said apparatus main body.

4. An image pickup apparatus comprising:
   a solid-state image pickup element provided with a plurality of color filters;
   difference encoding means for quantizing a difference between signals from pixels of the same kind of adjacent filters in a horizontal scanning direction of said solid-state image pickup element;
   non-linear processing means for non-linearly processing an output from said difference encoding means with a predetermined non-linear processing characteristic;
   A/D conversion means for A/D converting an output of said non-linear processing means with a predetermined conversion characteristic, said predetermined non-linear processing characteristic of said non-linear processing means being set according to said predetermined conversion characteristic of said A/D conversion means;
   an apparatus main body having an apparatus output terminal for supplying an output from said A/D conversion means; and
   a storage body capable of recording the output from said apparatus output terminal of said apparatus main body.

5. An apparatus according to claim 4, wherein said difference encoding means quantizes a difference between signals from every other pixel.

6. An apparatus according to claim 4, wherein said storage body includes a memory which is detachable from said apparatus main body.

7. A digital signal processing apparatus comprising:
   difference signal forming means for receiving signals from a solid-state image pickup element provided with complementary color filters and forming a signal corresponding to a difference between signals from adjacent pixels;
   a non-linear processing means for non-linearly processing an output from said difference signal forming means;
   A/D conversion means for A/D-converting an output from said non-linear processing means;
   a memory for storing first- and second-system signals as outputs from said A/D conversion means;
   first addition means for adding the first- and second-system signals sequentially read out from said memory, and outputting line sequential color difference signals;
   first inverting means for inverting a polarity of the first-system signals sequentially read out from said memory;
   second inverting means for inverting a polarity of the second-system signals sequentially read out from said memory;
   first selection means for switching and selecting the first-system signals sequentially read out from said memory and outputs from said first inverting means in units of pixels;
   second selection means for switching and selecting the second-system signals sequentially read out from said memory and outputs from said second inverting means in units of pixels;
   first decoding means for decoding the outputs from said first selection means;
   second decoding means for decoding the outputs from said second selection means; and second addition means for adding the outputs from said first and second decoding means to output a luminance signal.

8. An apparatus according to claim 7, wherein said difference signal forming means forms a difference signal between signals from pixels of the same kind of color filters.

9. A digital signal process apparatus comprising:
encoding means for non-linearly processing, with a predetermined non-linear processing characteristic, a signal corresponding to a difference between signals from pixels adjacent to each other, and for A/D-converting the non-linearly processed signal with a predetermined conversion characteristic, said predetermined non-linear processing characteristic being set according to said predetermined conversion characteristic;
a memory for storing an output from said encoding means;
means for forming a color difference signal on the basis of an output from said memory; and
means for decoding the output from said memory to form a luminance signal.

10. An apparatus according to claim 9, wherein said encoding means A/D-converts the difference between signals from every other pixel.

11. An apparatus according to claim 9, wherein said encoding means A/D-converts the difference between signals from a plurality of predetermined pixels in a horizontal direction.

12. An apparatus according to claim 9, wherein said encoding means A/D-converts the difference between signals from pixels of the same kind of color filters.

13. A signal process apparatus comprising a plurality of sets of channels, each of which includes:
means for sampling and holding signals from spatially adjacent pixels to which the same kind of color filters are attached; and
DPCM-type A/D-conversion means for, in accordance with a predetermined non-linear processing characteristic, non-linearly processing a difference between outputs from said sampling and holding means, and for A/D converting, in accordance with a predetermined conversion characteristic, the non-linearly processed difference, said predetermined non-linear processing characteristic being set in accordance with the predetermined conversion characteristic of said A/D conversion means.

* * * * *

UNITED STATES PATENT AND TRADEMARK OFFICE
CERTIFICATE OF CORRECTION

PATENT NO. : 5,309,183
DATED : May 3, 1994
INVENTOR(S) : TAKASHI SASAKI, ET AL.

Page 1 of 2

It is certified that error appears in the above-identified patent and that said Letters Patent is hereby corrected as shown below:

ON TITLE PAGE

In [56] References Cited, under U.S. PATENT DOCUMENTS:
"4,176,573  11/1979  Dillon et al." should read
--4,176,373  11/1979  Dillon et al.-- and
"3,017,456  1/1962  Schrieber" should read
--3,017,456  1/1962  Schreiber--.

COLUMN 1

Line 42, "t" should read --to--.

COLUMN 2

Line 13, "t" should read --to--.

COLUMN 3

Line 66, "o" should read --on--.

COLUMN 6

Line 12, "$-\alpha K\ V$" should read -- $-\alpha K_1 V$ --.

UNITED STATES PATENT AND TRADEMARK OFFICE
CERTIFICATE OF CORRECTION

PATENT NO. : 5,309,183
DATED : May 3, 1994
INVENTOR(S) : TAKASHI SASAKI, ET AL.

It is certified that error appears in the above-identified patent and that said Letters Patent is hereby corrected as shown below:

<u>COLUMN 10</u>

Line 24, "(e-Cy)-(Mg-G)=2R-G≈R-Y" should read --(Ye-Cy)+(Mg-G)=2R-G≈R-Y--.

Line 65, "Y3+Mg+Cy+G=2R+3G+2B≈Y" should read --Ye+Mg+Cy+G=2R+3G+2B≈Y--.

Signed and Sealed this

Fifteenth Day of August, 1995

Attest:

BRUCE LEHMAN

*Attesting Officer*   *Commissioner of Patents and Trademarks*